June 8, 1948.  J. B. FREDERIKSEN  2,442,974
FISH SPEAR
Filed Feb. 23, 1946
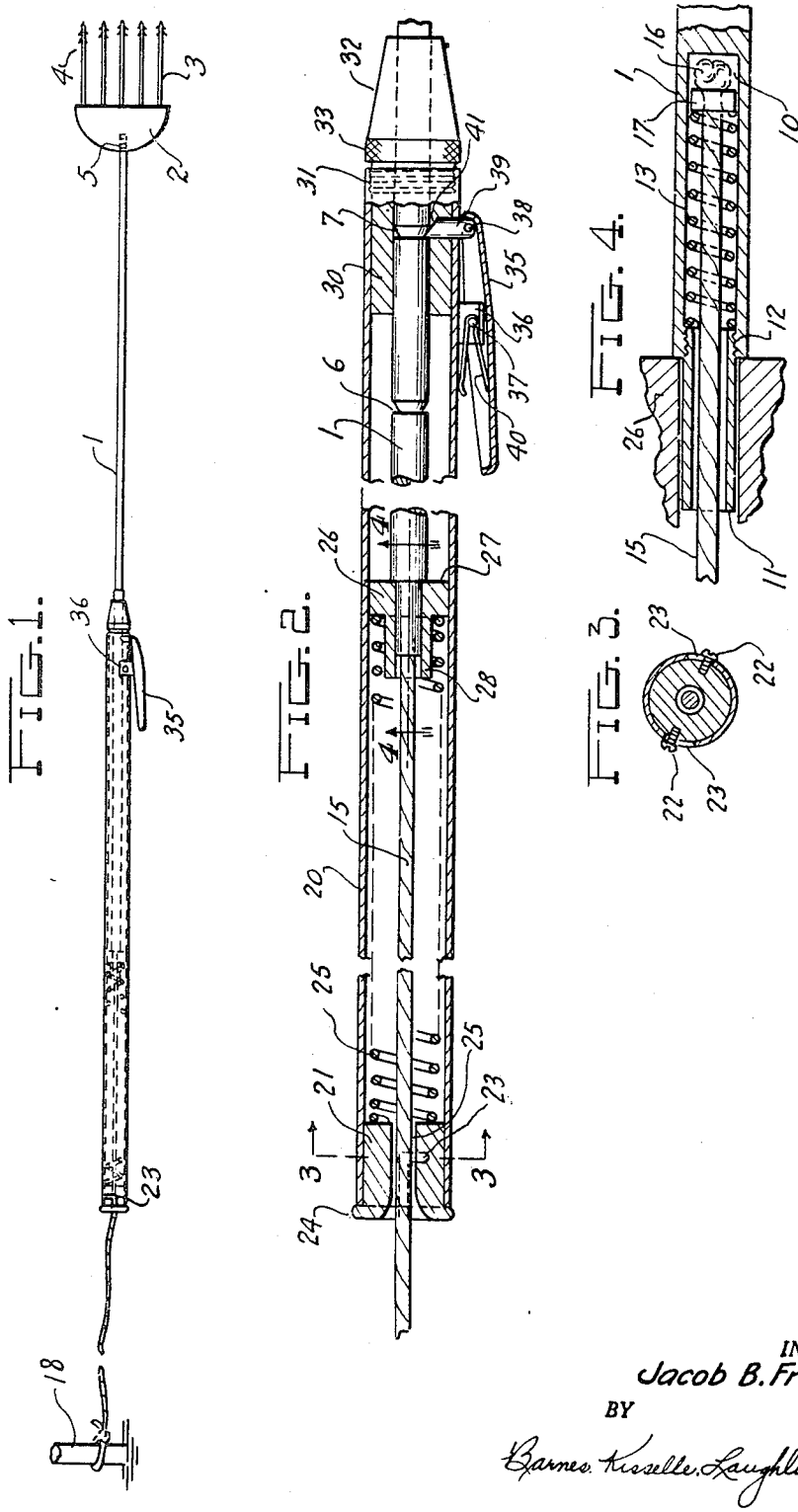
INVENTOR.
Jacob B. Frederiksen
BY
Barnes, Kisselle, Laughlin & Raisch
ATTORNEYS Patented June 8, 1948

2,442,974

UNITED STATES PATENT OFFICE 2,442,974

FISH SPEAR

Jacob B. Frederiksen, Detroit, Mich., assignor of one-half to Louis Sorensen, Detroit, Mich.

Application February 23, 1946, Serial No. 649,490

3 Claims. (Cl. 43—6)

This invention relates to a spearing device, useful especially for spearing fish.

The general objects of the invention are to provide an improved spear of the power projected type. In accordance with the invention an efficient but simple and rugged structure is provided which includes a tubular body which houses a projecting spring into which the shaft of the spear is insertable and the spring loaded or compressed. A trigger mechanism is employed for the release of the spring to project the spear. It is, moreover, an object of the invention to provide a tethered spear so that the spear, when projected, is retrievable. To this end, a suitable rope or cord, which may be generally termed a line, is attached to the end of the spear shaft and passes entirely through the tubular body and extends out the end of the tubular body opposite the end which receives the spear shaft. In use, the free end of the line may be advantageously, and preferably is, suitably attached or anchored so that it is not liable to be dropped. This is particularly desirable when fishing in fairly deep water else the entire spear may be lost.

A construction made in accordance with the invention is disclosed in the accompanying drawings:

Fig. 1 is a general view in elevation and with some parts indicated by dotted lines, illustrating the projectable spear.

Fig. 2 is an enlarged view largely in cross section, showing the interior structure of the tubular body or barrel, and showing the spear shaft telescoped into the same with the projecting spring compressed.

Fig. 3 is a sectional view taken substantially on line 3—3 of Fig. 2 showing an end construction.

Fig. 4 is an enlarged sectional view showing the attachment of the line to the end of the spear and taken substantially on line 4—4 of Fig. 2.

The spear shaft is illustrated at 1, this preferably being a shaft of suitable steel and it advantageously may be a shaft of corrosion resisting steel, although this is not necessary. The spear head is illustrated as having a body 2 with a plurality of tines 3 projecting therefrom each of which may be suitably barbed as at 4. The end of the shaft may be screw threaded to the spear head as illustrated at 5. It will be understood that the spear heads may vary in shape, size and design depending upon the desires of the user and upon the type or class of fishing engaged in at the particular time. As illustrated in Fig. 2, the shaft 1 is provided with circumferential grooves 6 and 7 for purposes which will presently appear.

As shown in Fig. 4 the end of the shaft opposite the spear head is provided with a recess or cavity 10 which may be partially closed by a sleeve or bushing 11 attached by screw threads 12 and within the cavity is a coil spring 13 arranged to abut the end of the bushing. A suitable line 15 which may be a rope or cord or the like, is passed through the bushing so that it is slidable as indicated, and through the spring, and the end of the line is knotted or provided with an enlargement 16 with preferably a ring or washer element 17 disposed between the enlargement 16 and one end of the spring. As mentioned above, the opposite end of the line may be suitably anchored to any device such as is illustrated at 18.

The barrel of the fish spear, which also is the body portion and constitutes a handle by which the device is manipulated is illustrated at 20. One end is provided with a bushing 21 which may be attached to the barrel by insertion into the barrel, the bushing being provided with projecting stud devices which may be screws 22 adapted to fit into the bayonet slots 23 in the barrel. The screws 22 may be replaced by suitable studs or rivet-like devices. The bushing preferably has a flange 24 for abutting against the end of the barrel and it has a central opening 25 for the passage of the line 15 therethrough.

Within the barrel is a coiled spring 25, one end of which is arranged to react against the bushing 21. At the other end of the spring is a piston or head 26. This head has an enlarged portion 27 fitted for a nice sliding action within the barrel and a portion of smaller diameter 28 around which the spring fits so that the end of the spring abuts the larger portion 27. The piston 26 has an aperture extending therethrough so that the bushing 11 may slidably pass into the piston with the piston acting directly against the end of the spear shaft as illustrated in Figs. 2 and 4.

The end of the barrel for receiving the spear shaft is provided with an end piece 30 which telescopes within the end of the barrel and which may be screw threaded thereto as shown at 31. This bushing or end piece has an exposed part preferably of tapered form as illustrated at 32 and a portion of the exposed part may be knurled or roughened as at 33 so that it may be easily screwed into the barrel. This end piece or bushing is centrally apertured for slidably receiving the shaft.

The barrel is provided with a suitable trigger mechanism, here shown as comprising a lever 35. A bracket 36 is secured to the barrel by rivets or the like and the lever is pivoted to the bracket by a pivot pin 37. Secured to the lever as by means of a pivot pin 38 is a detent or trigger 39 which passes through the barrel and is arranged to engage one of the circumferential notches in the spear shaft as illustrated in Fig. 2. It will be noted that the walls of the notches 6 and 7 are arranged to make direct engagement with the detent in radial extent while the opposite walls may be angularly disposed as indicated. There is a spring 40 which acts upon the lever to normally project the detent into the barrel. As shown in Fig. 2, the detent passes through an aperture in the bushing 30 so that its position is strongly held and the inclined face 41 of the detent may be engaged by the spear as it is telescoped into the barrel to cause the detent to retract in such action.

As illustrated in Figs. 1 and 2 the spear shaft is inserted into the barrel and the projective spring is compressed. As the spear shaft is pushed into the barrel the inclined surface 41 of the detent is engaged thus causing it to be retracted against the action of the spring 40 and the spear engages the head 26 and with suitable pressure applied the spring 25 is compressed. The spear shaft may be provided with any desired number of notches, such as notches 6 and 7 so that the spring may be compressed to different amounts. In this loading or setting of the spear it is to be seen that the line 15 is suitably retracted or drawn from the opposite end of the barrel. In the use of the spear the operator grasps and holds the barrel and upon manipulation of the lever 35 the detent may be retracted to release the spear and it is projected by the spring.

One use of the spear is that of fishing through the ice. In this, the fisherman remains in readiness at an opening in the ice with the spear loaded and it can be released when a fish swims by the opening. Sometimes this is done in fairly deep water, and the spear can be retracted by means of the line. Furthermore, if the line is anchored, the entire device, including the spear and barrel may be retrieved if it is accidently dropped into the water. When a spear is projected, the head or piston 26 is stopped by engagement with the bushing 30 and the arrangement is preferably such that the portion 28 of the head remains within the end of the spring. It will be understood, of course, that there will be an ample excess length in the line between the barrel and the anchor 18, so that the spear may be projected a distance suitable for the purpose. When the spear is projected and comes to the end of the line, the spring 13 absorbs the shock thus preserving both the line, the spear shaft and other parts.

I claim:

1. A spear for fish or the like comprising, a shaft for receiving a spear head, said shaft having a groove therein, a barrel, an end piece at one end of the barrel for slidably receiving the shaft, a closure piece at the opposite end of the barrel having an opening therethrough, a head slidably mounted in the barrel and separable from the shaft, a spring positioned between the closure piece and head, said head being engageable by the shaft as the shaft is inserted into the barrel to shift the head and stress the spring, a detent mounted on the barrel and projectable into the same to engage the groove in the shaft to hold the shaft positioned with the spring in stressed condition, means on the barrel to actuate the detent to release the shaft whereby the shaft may be separated from the head and projected by the spring, and a line attached to the end of the shaft which is insertable into the barrel and extending through the barrel and through the opening in the said closure piece.

2. In a spear for fish or the like, comprising a shaft for receiving a spear head, a barrel for telescopingly receiving the shaft, a spring in the barrel adapted to be stressed as the shaft is telescoped into the barrel, releasable means for latching the shaft in telescoped position with the spring stressed whereby the shaft is projected by the spring when the means is released, a tether line extending into the barrel from the end thereof opposite the end which receives the shaft, the end of the shaft which is telescoped into the barrel being of hollow construction, a bushing in the end of the hollow portion of the shaft, and a coiled spring in the hollow portion of the shaft arranged to react against the bushing, said line extending through the bushing and through the spring and having an enlargement for engaging the end of the spring opposite the bushing, said spring adapted to absorb the shock when the shaft is projected to the limit of the tether line.

3. A spear for fish or the like comprising a shaft for receiving a spear head, said shaft having a plurality of grooves therein, a barrel, a bushing at one end of the barrel for slidably receiving the shaft, an apertured bushing at the opposite end of the barrel, a head member slidably mounted in the barrel and separable from the shaft, a coiled spring positioned between the apertured bushing and the head, a tether line extending through the apertured bushing and having one end attached to the end of the shaft, the shaft being adapted to engage the head member as it is telescoped into the barrel to compress the spring, a detent slidably mounted in the wall of the barrel, spring means for projecting the detent into the barrel to engage one of the grooves in the shaft to hold the shaft telescoped into the barrel with the spring compressed, and operating means for retracting the detent for the projection of the spear shaft by the coiled spring.

JACOB B. FREDERIKSEN.

REFERENCES CITED

The following references are of record in the file of this patent:

UNITED STATES PATENTS

| Number | Name | Date |
| --- | --- | --- |
| 554,764 | Ackerson | Feb. 18, 1896 |
| 784,747 | Lobit | Mar. 14, 1905 |
| 1,727,812 | David | Sept. 10, 1929 |
| 2,404,249 | Potter | July 16, 1946 |